US008454868B2

(12) United States Patent
Roemer et al.

(10) Patent No.: US 8,454,868 B2
(45) Date of Patent: Jun. 4, 2013

(54) METHOD FOR TESTING MULTILAYER TABLETS

(75) Inventors: Harald Roemer, Reinbek (DE); Jan Naeve, Schattin (DE); Heinrich Behrmann, Schwarzenbek (DE); Kurt Marquardt, Hamburg (DE)

(73) Assignee: Fette GmbH, Schwarzenbek (DE)

( * ) Notice: Subject to any disclaimer, the term of this patent is extended or adjusted under 35 U.S.C. 154(b) by 129 days.

(21) Appl. No.: 12/328,453

(22) Filed: Dec. 4, 2008

(65) Prior Publication Data

US 2009/0152751 A1 Jun. 18, 2009

(30) Foreign Application Priority Data

Dec. 14, 2007 (DE) ......................... 10 2007 061 081

(51) Int. Cl.

| | |
|---|---|
| ***B29C 45/76*** | (2006.01) |
| ***B29C 47/92*** | (2006.01) |
| ***D04H 1/16*** | (2006.01) |
| *A01J 21/00* | (2006.01) |
| *A01F 25/14* | (2006.01) |

(52) U.S. Cl.

USPC ......... 264/40.1; 264/40.4; 264/109; 264/112; 264/113; 264/255; 264/297.1; 264/297.4; 264/297.6; 264/297.8

(58) Field of Classification Search

USPC .............. 264/40.1, 40.4, 40.5, 113, 120, 109, 264/112, 255, 297.1, 297.4, 297.6, 297.8, 264/319; 425/169, 344, 347, 348 R, 352; 100/144, 151

See application file for complete search history.

(56) References Cited

U.S. PATENT DOCUMENTS

| | | | | |
|---|---|---|---|---|
| 2,944,493 | A | 7/1960 | Bailey et al. | |
| 3,063,390 | A * | 11/1962 | Frank | 425/134 |
| 3,158,109 | A * | 11/1964 | Stott | 425/134 |
| 3,255,716 | A * | 6/1966 | Knoechel et al. | 264/40.4 |
| 3,332,367 | A | 7/1967 | Sperry et al. | |
| 3,483,831 | A * | 12/1969 | Funakoshi et al. | 425/345 |
| 4,640,376 | A * | 2/1987 | Hinzpeter | 177/50 |
| 4,817,006 | A * | 3/1989 | Lewis | 700/206 |
| 5,213,818 | A * | 5/1993 | Facchini et al. | 425/139 |
| 5,322,655 | A * | 6/1994 | Ebey | 264/40.5 |
| 5,350,548 | A * | 9/1994 | Hinzpeter et al. | 264/40.4 |
| 5,596,865 | A * | 1/1997 | Kramer | 53/428 |
| 2005/0200038 | A1* | 9/2005 | Vogeleer et al. | 264/40.1 |
| 2005/0220872 | A1* | 10/2005 | Ozeki | 424/468 |
| 2010/0059292 | A1* | 3/2010 | Naeve et al. | 177/145 |

FOREIGN PATENT DOCUMENTS

| | | |
|---|---|---|
| DE | 4218122 | 1/1994 |

* cited by examiner

*Primary Examiner* — Christina Johnson
*Assistant Examiner* — Atul P. Khare
(74) *Attorney, Agent, or Firm* — Vidas, Arrett & Steinkraus, P.A.

(57) ABSTRACT

The present invention is related to a method for testing multilayer tablets in a multiple rotary press, in which die holes of a circulating die plate are successively filled with tablet material of different layers in succeeding filling devices, and the tablet material is compressed one layer after the foregoing layer into pressed articles having n layers by means of synchronously circulating compression punches, and the pressed articles are subsequently ejected in an unloading station and taken out, in which in a testing procedure, pressed articles with m layers are taken out after the compression in a respective unloading station and are conveyed to a testing station, wherein applies 1<=m<=n, wherein before taking out the pressed articles, at least the m-th layer is compressed more strongly than during the normal manufacture of the multilayer tablets, wherein applies m<n. According to the present invention it is provided that only pressed articles of die holes are supplied to the testing station, which had been completely filled with the tablet material of the m-th layer already before the initiation of the testing procedure.

7 Claims, 2 Drawing Sheets

METHOD FOR TESTING MULTILAYER TABLETS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a method for testing multilayer tablets in a multiple rotary press, in which die holes of a circulating die plate are successively filled with tablet material of different layers in succeeding filling devices, and the tablet material is compressed one layer after the foregoing layer into pressed articles having n layers by means of synchronously circulating compression punches, and the pressed articles are subsequently ejected in an unloading station and taken out, in which in a testing procedure, pressed articles with m layers are taken out after the compression in a respective unloading station and are conveyed to a testing station, wherein applies 1<=m<=n, wherein before taking out the pressed articles, at least the m-th layer is compressed more strongly than during the normal manufacture of the multilayer tablets, wherein applies m<n.

Rotary presses for the manufacture of tablets, consisting of very different substances and serving for very different purposes of application, are commonly known. In these, a die plate, mostly driven around a vertical axis, has dies arranged on a circle, to which compression punch pairs circulating synchronously with the plate are assigned. The actuation of the compression punches takes place by radial cams and compression rollers. During the filling of the die holes with the usually powder-shaped tablet material by means of a suitable filling device, the lower punch of a pair forms the bottom of a moulding cavity, wherein its height in the die pre-sets the dosage. Subsequently, the compression of the tablet material to a desired height (the cylindrical height) takes place by moving the opposing compression punches towards each other in a compression station. The compression station has normally a pre-compression station and a main compression station. Following the compaction, the lower punches, controlled by an ejection cam, thrust the tablets out of the die at a certain position of the machine, while the opposing row of punches (the upper punches) gradually moves out of the die plate. Through this, a stripping device can strip off the ejected pressed articles from the die plate and supply them to a discharge channel.

For the manufacture of tablets having two or more layers with a rotary press of the mentioned kind, the respective described stations are provided repeatedly, according to the number of the envisioned layers. In this, a first layer is filled in at first in a first filling device, and slightly compacted by means of the compression punches. Through the rotation of the die plate, the die hole filled with the first layer arrives at a subsequent filling device, in which the second layer is filled in above the first layer. This second layer is then slightly compacted again. This procedure is repeated for so long until the last layer of the tablet which is to be produced (the n-th layer) has been filled into the die hole. After filling with the last layer, the compression to a multilayer tablet takes place, with subsequent unloading from the apparatus, as has been explained.

There is the necessity to test amongst others the weight of the produced tablets, and to perform a correction as the case may be. Therefore, one or several discharge channels in the press may be provided with discharge switches, which selectively direct arriving tablets into the direction of a testing station. Testing stations, in which the testing procedures are automatically performed, like a weight measurement for instance, are also already known. In order to be able to determine even in a multilayer tablet which one of the layers is defective when there is a deviation from a desired weight, there is the necessity to check the weight of individual layers of the tablet. A corresponding testing method for a double layer tablet is known from DE 42 18 122 C1, for instance, the entire contents of which is incorporated herein by reference. In this, pressed articles with the first layer are taken out after the compression in a testing procedure and conveyed to a testing station, where the weight of the first layer is measured. In order to facilitate the ejection of the pressed article consisting of only one layer in this, and in order to prevent that uncompressed material is accumulated on the die plate and in the remaining area of the press, the first layer of the pressed article is compressed more strongly before the removal for a test, than this is the case during the normal manufacture of the multilayer tablets.

A problem arises in that the force conditions and with this the vibration behaviour of the tablet press are changed by the stronger compression. This in turn leads to a changed filling of the die holes with the individual layers, and through this to changed layer weights. The measured weight of layer samples taken under these conditions is therefore not always representative for the tablets formed with the plant in the normal operation.

Starting from the explained state of the art, the present invention is based on the objective to indicate a method of the kind mentioned in the beginning, by which a representative test of the layers of a multilayer tablet is possible.

BRIEF SUMMARY OF THE INVENTION

For a method of the kind mentioned in the beginning, the present invention resolves the problem in that only pressed articles of die holes are supplied to the testing station, which had been completely filled with the usually powder-shaped tablet material of the m-th layer already before the initiation of the testing procedure. According to the present invention, the pressed articles are each one produced in the kind mentioned above, up to the m-th layer, i.e. up to reaching the last layer before the testing procedure. In particular, the first, second, third and so on layers are consecutively filled in successive filling devices. Always after filling in a layer, this layer can be easily compressed, before the next layer is filled in. Even in the method of the present invention, the last layer before taking out the pressed articles for a test (the m-th layer) is compressed stronger than this is the case in the normal operation in the context of the slight compaction or compression, respectively. Of course, even layers of the tablets lying further down can also be compressed stronger than in the normal case. The stronger compression can be achieved by a reduction of the cylindrical height. In this way, samples of a greater hardness are formed.

In order to avoid that after the initiation of the testing procedure, not representatively filled pressed articles distort the test result due to the deviation of the plant from the normal operation conditions, according to the present invention only such layers are used as samples which have left the last filling device before the unloading position for the testing procedure already before the triggering of the testing or sample take out procedure. Thus, these are pressed articles which are situated between the filling device for the m-th layer and the compression position for the m-th layer (or in the compression position for the m-th layer) at this point of time. Hence, according to the present invention, only pressed articles of such die holes are used for the test which had already been filled completely for the test in the point of time of the initiation of the testing procedure. In this way it is made sure that the pressed articles supplied to the testing station had still been filled under normal conditions of operation. As a result, any influence on the test result of the layer samples through the testing procedure itself can be excluded. The tablets tested according to the present invention are representative for the layers formed in the normal operation of the plant.

In this, like for instance by means of the distance between the respective unloading station for the test or the last compression station before the test, respectively, and the preceding filling device, and from the distance between the die holes, it can be easily determined how many of the die holes succeeding after the initiation of the testing procedure had been already filled completely with the m-th layer, i.e. how many of the succeeding die holes have already left the last filling station. Based on this, a discharge switch of the respective discharge channel can be switched such that the undesired pressed articles are no more supplied to the testing station.

The testing procedure is initiated by the start of the first compression of a tablet layer which takes place stronger than in the normal operation of the plant. That point in time is decisive from on which the press leaves its normal operation conditions, i.e. the conditions present in the normal tablet production. This can even be the case like for instance after a slow down of the die plate for the testing procedure.

The number of layers of the tablets normally formed by the multiple rotary press is in principle arbitrary in this. In particular holds $n \geqq 2$. Thus, tablets with 2, 3, 4 and so on layers can be formed. Correspondingly, pressed articles having 1, 2, 3, 4 and so on layers can be conveyed to the testing station ($1 <= m <= n$). For this purpose, corresponding (intermediate) unloading stations can be assigned to each compression station for the tablet layers, to which corresponding feed lines to the testing station are assigned in turn.

It is possible to sort out compressed pressed articles also from on the initiation of the testing procedure up to the definitive achievement of the respective stronger compression, i.e. for instance until a cylindrical height has reached its definitive new setting. Thus, from the pressed articles already completely filled with the m-th layer at the point in time of the initiation of the testing procedure, the first ones are not conveyed to the testing station in this case, for so long until the stronger compression (changed cylindrical height for instance) has been definitively reached. Through this, an undesired accumulation of material on the press is avoided. In a corresponding manner, pressed articles can be sorted out which were compressed after the end of the testing procedure, up to the complete re-achievement of the normal compression conditions.

In a particularly practical manner, the weight of the pressed articles can be measured in the testing station. Of course, even other parameters can be measured. It is also particularly practical to convey pressed articles of die holes which had not been completely filled with the tablet material of the m-th layer before the initiation of the testing procedure to a channel for defective articles. In this, a discharge switch, switchable between a channel for defective articles and a supply line to the testing station, can be assigned to the respective (intermediate) unloading station. The tablets guided into the channel for defective articles can either be disposed of or, if possible, processed to tablet powder again and reused.

According to one embodiment, for the testing procedure, the die plate can be rotated into a first compression position for stronger compression of at least the m-th layer of a first pressed article envisioned for testing, rotated to a next compression position for the compression of at least the m-th layer of a next pressed article envisioned for testing after the compression of the first pressed article, and successively rotated farther after the compression of the next pressed article, for so long until all the pressed articles of die holes which had been completely filled with the tablet material of the m-th layer already before the initiation of the testing procedure have been supplied to the testing station. Thus, in this embodiment the plant is stepwise or continuously rotated farther, and one farther pressed article at a time is compressed in the next die hole in doing so. After the compression of a respective pressed article, a respective lower punch can be moved towards the upside into an ejection position by the ejection cam, so that the pressed article can be thrust into that channel by a stripping device which supplies the pressed article to the testing station. After all the desired pressed articles have been supplied to the testing station, the discharge channel can be rearranged such that farther pressed articles are supplied to a channel for defective articles up to the return of the plant into its normal operation. Provided that a pre-compression station and a main compression station are provided, as is usually the case, the term compression position comprises both compression stations in this. I.e., provided that for instance the stronger compression of the m-th layer takes place not before the main compression station, the first and the second compression position are the positions at the main compression stations. However, of course the plant can also always move to the pre-compression station for a pre-compression when it is between the compression positions defined in this way. The rotor with the die plate can continue to rotate further in this. Thus, it is not necessary that it stops at the respective compression stations.

According to a further embodiment, the die plate can be stopped for the initiation of the testing procedure and/or for the termination of the testing procedure. In this manner, the compression, the cylindrical height for instance, can be adapted for the testing procedure in a simple way, without that further pressed articles are unnecessarily compressed during the adaptation process, which would have to be sorted out thereafter. After the completion of the sample taking, i.e. when all the pressed articles filled under normal operation conditions have been supplied to the testing station, the rotor with the die plate can be stopped again, so that the cylindrical height can be set into its normal position again. Thereafter, the rotor can be accelerated and the normal tablet production can be continued. Thus, the number of pressed articles which have to be sorted out can be minimised.

In order to avoid an unnecessary product loss of the further tablet material which has to be filled up onto the m-th layer in the normal operation (i.e. of the tablet material of the (m+1)-th, (m+2)-th and so on layer), during the testing procedure, a lower punch of the rotary press ejecting the pressed article which is to be tested can be held flush with the topside of the die plate at least during the passage of a successive filling station for filling in tablet material of the m-th layer, preferably of all the successive filling stations. A filling of the respective cavity with tablet material is avoided in this way. Alternatively or in addition, die holes which had been filled with tablet material in succeeding filling devices after the initiation of the testing procedure in the filling device for the m-th layer, are emptied for the duration of the testing procedure by means of a suction extractor unit. Thus, in this embodiment, filled tablet material is sucked off in filling devices which follow that filling device (filling device for the m-th layer) which had passed through as the last one before the testing procedure. For this purpose, respective suction extractor units can be assigned to the successive filling devices. The suction extracted material can subsequently be disposed of or reused if possible. In this way, a compression of incorrectly filled cavities, in particular of cavities less filled than is correct, can be avoided.

Alternatively, it is also possible to fill the layers following if so after the m-th layer normally into the then empty die holes and to compress them and to sort them out subsequently.

The described method of the present invention can be applied to all the compression stations of a multiple rotary press. For instance, a first tablet layer can be taken out for a test on a first compression station, the first and the second layer together on a second compression station, and the first, second and third layer can be taken out together for a test procedure on a third compression station and so on. For further layers it may be proceeded analogously. The weights of the individual layers can then be determined by calculating the difference between the respective measured weights. For instance, the weight of the second tablet layer results from the weight of the double layer sample minus a previously measured weight of the first layer.

Through the method of the present invention, a manual separation of the layers is no more necessary in order to determine the accurate weight of the individual layers of a multilayer tablet. Furthermore, the testing procedure and the weight measurement in particular are based on layers which are not distorted by influences of the testing procedure.

BRIEF DESCRIPTION OF THE SEVERAL VIEWS OF THE DRAWINGS

The present invention is explained in more detail in the following by means of an example of its realisation. Schematically show.

DETAILED DESCRIPTION OF THE INVENTION

Figure 1:
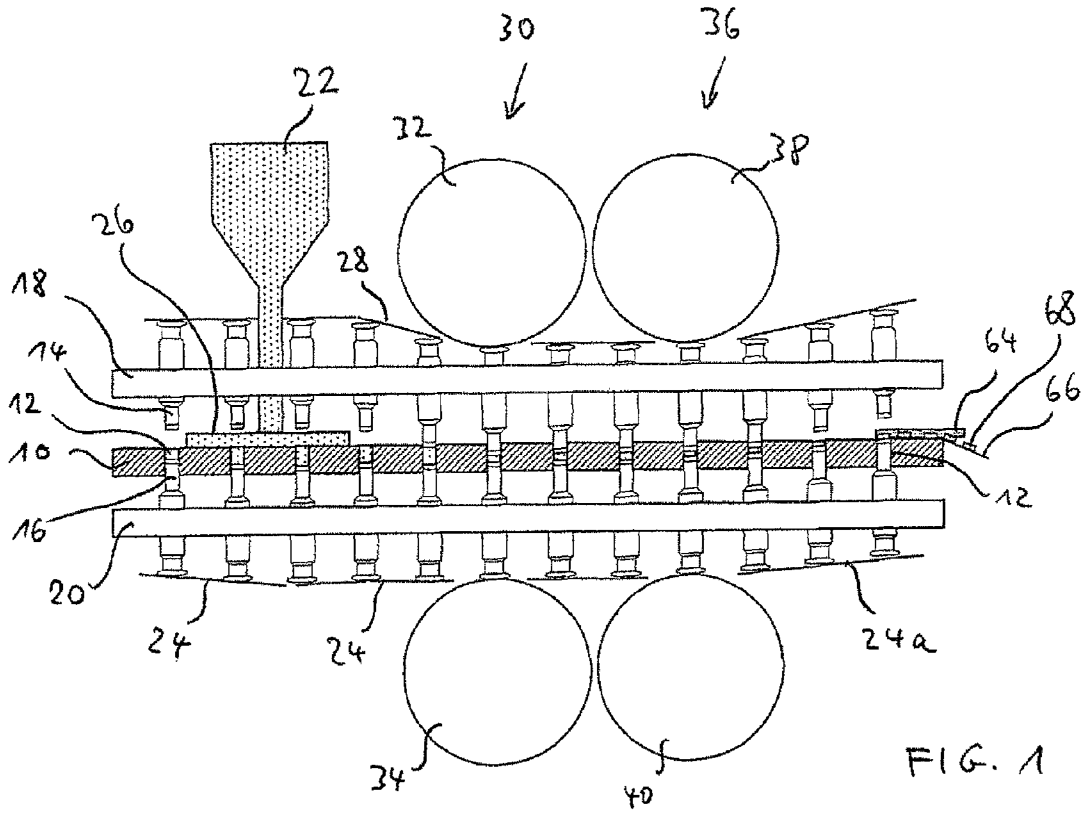
FIG. 1 a cut-out cross section of a multiple rotary press used according to the present invention, at a first compression station, FIG. 2 a cut-out cross section of the multiple rotary press depicted in FIG. 1, at a second compression station, and FIG. 3 a top view of the die plate of the multiple rotary press depicted in FIGS. 1 and 2.

While this invention may be embodied in many different forms, there are described in detail herein a specific preferred embodiment of the invention. This description is an exemplification of the principles of the invention and is not intended to limit the invention to the particular embodiment illustrated The rotary press depicted in the realisation example in the figures is a twin rotary press with two compression stations, which are shown in the FIGS. 1 and 2. In FIG. 3, the die plate of the twin rotary press is depicted in a top view. Same reference signs denote the same objects in the figures.

The rotary press has a die plate 10, which is driven rotatingly around a vertical axis. The die plate 10 has a row of passing through die holes 12. A pair of compression punches 14, 16 is assigned to each die hole 12. The upper compression punches 14 are axially movably mounted in a plate 18, which is driven synchronously with the die plate 10. In a corresponding manner, the lower compression punches 16 are axially movably mounted in a plate 20, which also circulates synchronously. The axial position of the compression punches 14, 16 is determined by radial cams, with which the rear ends of the compression punches 14, 16 co-operate in a per se known manner.

In FIG. 1, a first filling station with a first filling device 22 is arranged above the die plate 10. Powder shaped tablet material for a first layer of a double layer tablet to be produced in the press is filled by means of the filling device 22 into the die holes 12 which pass along. The filling depth is determined by the position of the lower compression punches 16, whose position is in turn determined by cam segments 24 of lower radial cams. Actuated by the cam segments 24, the lower compression punches 16 gradually unblock the die holes 12 which pass along. The filling depth of the material of the first layer can be determined by adjusting the cam segments. A plate 26 following the filling device 22 and lying on the die plate 10 prevents any soaking out of the material from the die holes 12, until even the upper compression punches 14 co-operate with the die holes 12 with the aid of an upper cam segment 28 of a pre-compression station 30.

The pre-compression station 30 is formed by upper and lower pre-compression rollers 32, 34, which determine through their height the degree about which the filling in the die holes 12 is pressed together. The height of the pressed article obtained in this way is also called the cylindrical height. The definitive cylindrical height is then determined also by vertically adjustable main compression rollers 38, 40 in the subsequent main compression station 36.

Figure 2:
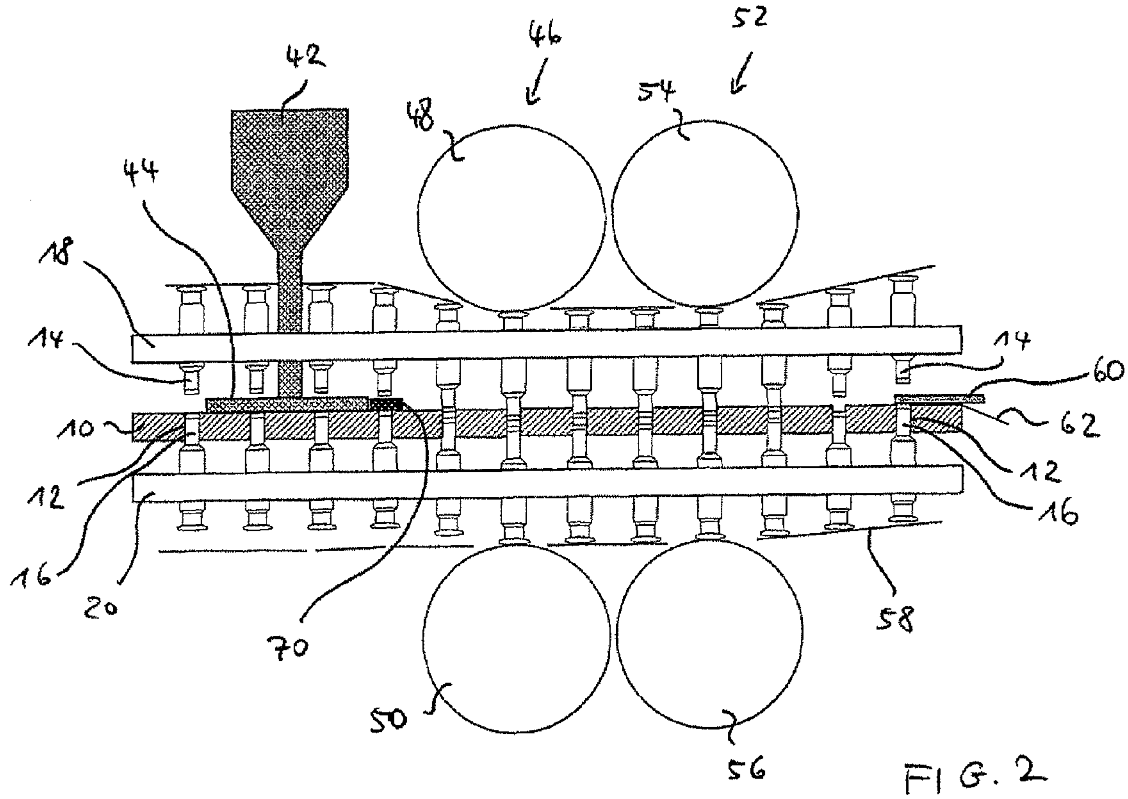
Figure 3:
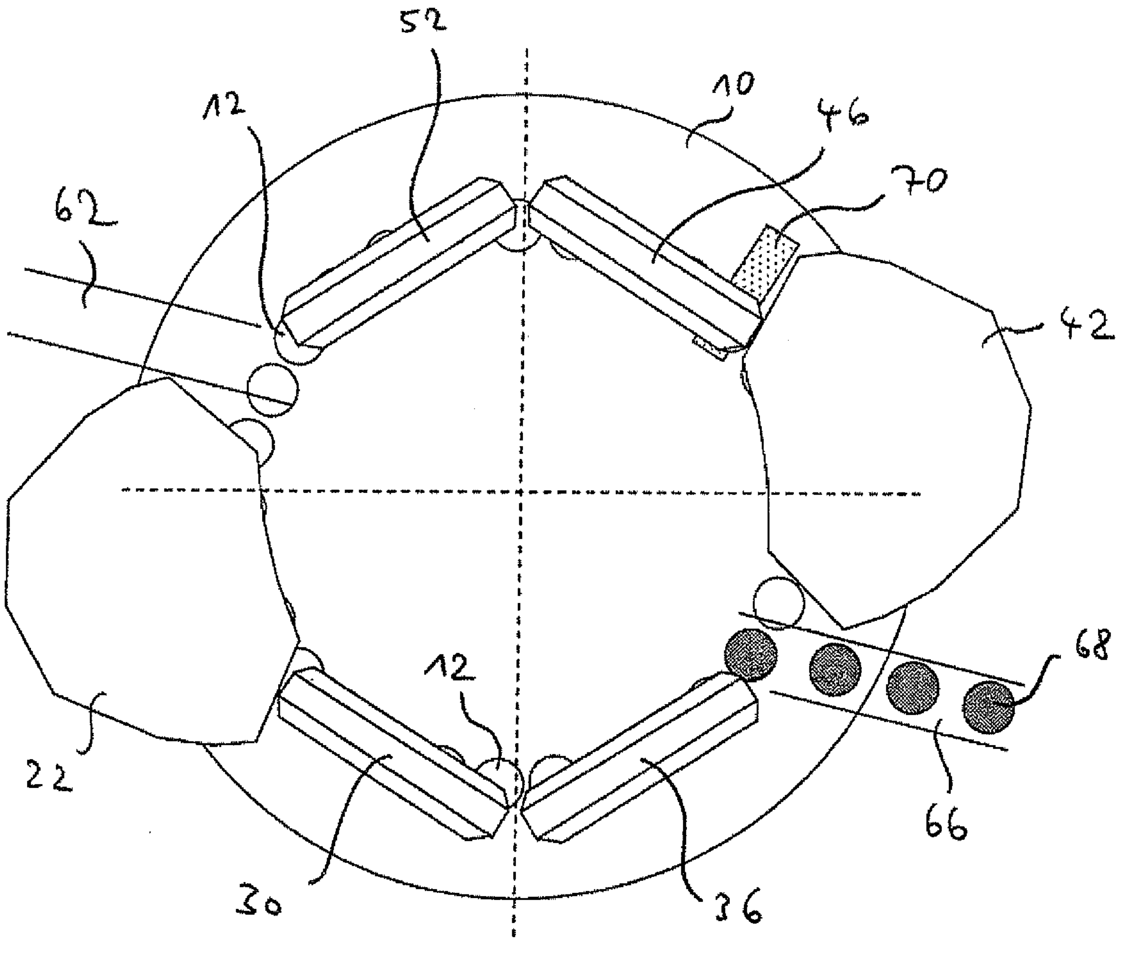

In FIG. 2, the second compression station of the twin rotary press is depicted. In analogy to the depiction in FIG. 1, a filling device 42 is depicted even in FIG. 2, by which in the normal operation of the press, a second layer of another powder-shaped tablet material is filled onto the first layer which was slightly compacted in the first compression station. For this purpose, the second filling device 42 again features a plate 44 laying on the die plate 10, which prevents any soaking out of the material from the die holes 12, until the upper compression punches 14 co-operate again with the die holes 12, with the aid of the pre-compression station 46 of the second compression station and of the pre-compression rollers 48, 50 in particular. After a compaction in the pre-compression station 46, the definitive compression takes place in the main compression station 52 of the second compression station, by the main compression rollers 54, 56. In the normal operation of the press, the pressed articles compressed with two tablet layers in this way are subsequently ejected from the die holes 12 by the lower punches 16, which are moved towards the upside with the aid of the ejection cam segment 58. By means of a stripping device 60, the pressed articles ejected in this manner can then be supplied to a discharge channel 62 and transported further from there.

In the following, the use of the twin rotary press for a testing procedure of measuring the weight of the first layer of the pressed articles will be described. In order to initiate the testing procedure, the die plate 10 is stopped at first. Subsequently, the cylindrical height of pressed articles to be compressed in the first compression station is reduced by means of a vertical adjustment of the main compression rollers 38, 40 of the first compression station depicted in FIG. 1, and by doing so the hardness of a sample compressed therein is increased. As a consequence, the pressed article is compressed stronger with its first layer for the testing procedure than in a small compaction taking place in the normal operation. Subsequently, the rotor 10 is set into movement again, and by means of the ejection cam 24*a* in FIG. 1, the lower compression punches 16 are thrust onto the surface of the die plate 10 after the stronger compression of the first layer in the first compression station, and from there the pressed articles are conveyed into a discharge channel 66 by means of a stripping device 64. From the discharge channel 66, the pressed articles 68 with the first layer can be supplied to a not depicted testing station, for weight measurement in the present case. Such testing stations are per se known to those skilled in the art.

As long as the pressed articles of the first layer are ejected in the described manner and are supplied to the discharge channel 66, as a consequence, empty die holes 12 pass the second compression station depicted in FIG. 2. In order to prevent undesired filling of the die holes 12 with the material of the second layer in the second filling device 42, the lower punches 16 are held flush with the upper side of the die plate 10 during the passage of the filling station 42 during the testing procedure. The die holes 16 are widely closed through this. In order to keep off tablet material from the apparatus, which occasionally accumulates anyhow, a suction extractor unit 70 succeeding the second filling device 42 is furthermore provided for suction extraction of excess tablet material of the second layer. The die holes 16 emptied in this way subsequently pass the second compression station.

In the method of the present invention, only pressed articles 68 of die holes 12 are supplied to the testing station which had been completely filled with the tablet material of the first layer already before the initiation of the testing procedure, i.e. before the stopping of the die plate 10 in this case, i.e. those which had already left the first filling device 22 in this point of time. During the testing procedure, subsequent pressed articles are also guided into the discharge channel 64 by the stripping device 64; however, from the same, the pressed articles are guided to a not shown channel for defective articles by a not shown discharge switch. They can subsequently be processed into powder-shaped tablet material again and reused. After the end of the testing procedure, the rotor 10 is stopped again, and the cylindrical height defined by the vertical position of the main compression rollers 38, 40 of the first compression station is set to the value in the normal production operation again. In the same way, the ejection cam 24*a* is moved into a lower position again, so that pressed articles are not ejected after passing the first compression station, and thus cannot be guided into the discharge channel 66 by the stripping device 64. As soon as this has happened, the rotor 10 is accelerated to its normal production velocity again and the normal production of double layer tablets is begun again. Of course, the suction extraction unit 70 after the second filling device 42 is deactivated in this. Pressed articles which had been compressed during the restart of the rotor 10 up to reaching its operational rotation speed, can again be conveyed to a channel for defective articles.

With the method of the present invention it is made sure that only such pressed articles are supplied to the testing station whose layers had been filled under conditions which are representative for the normal operation of the press. The test, and the weight measurement in particular, are therefore not distorted in an undesired manner.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method for testing single or multilayer tablets manufactured in a multiple rotary press in which during normal operation:

die holes of a circulating die plate of the press are successively filled with tablet material of different tablet layers in succeeding filling devices;

the filled tablet material is compressed one layer after the foregoing layer into pressed tablets having n layers by means of synchronously circulating upper and lower compression punches; and the pressed tablets are subsequently ejected at one of a plurality of unloading stations and taken out of the press, whereby in a testing procedure:

pressed articles are produced having only m layers of said tablets, whereby 1<=m<n;

at least the m-th layer of said pressed articles is compressed more strongly than during normal manufacture of the tablets; and the pressed articles having said more strongly compressed at least m-th layer are elected and taken out at one of said plurality of unloading stations and conveyed to a testing station, wherein m-th layer tablet material of each of said pressed articles conveyed to the testing station has already been completely filled into respective die holes before initiation of said stronger compression so that the only pressed articles which are conveyed to the testing station have been filled into said die holes under normal conditions of operation without concurrent application of any stronger compression, and wherein the weight of each m-layer article is the same as the weight of an m-layer article filled into die holes under normal conditions of operation without concurrent application of any stronger compression.

2. A method according to claim 1, wherein the weight of the pressed articles is measured in the testing station.

3. A method according to claim 1, wherein any remaining pressed articles of die holes which are filled with m-th layer tablet material after initiation of said stronger compression are conveyed to a channel for defective articles.

4. A method according to claim 1, wherein for the testing procedure, the die plate is rotated into a first compression position for stronger compression of at least an m-th layer to form a first pressed article envisioned for testing, wherein after the compression of the first pressed article, the die plate is rotated to a next compression position for the compression of at least a next m-th layer to form a next pressed article envisioned for testing, and wherein after the compression to form the next pressed article, the die plate is successively rotated further for so long until all pressed articles of die holes which had been completely filled with m-th layer tablet material before initiation of said stronger compression have been supplied to the testing station.

5. A method according to claim 1, wherein the die plate is stopped for the initiation of the testing procedure and/or for the termination of the testing procedure.

6. A method according to claim 1, wherein during the testing procedure, a lower punch of the rotary press elects the pressed article which is to be tested and is subsequently held flush with the topside of the die plate at least during the passage of a successive filling station.

7. A method according to claim 1, wherein die holes which had been filled with pressed articles conveyed to the testing station are emptied for the duration of the testing procedure by means of a suction extractor unit.

* * * * *

UNITED STATES PATENT AND TRADEMARK OFFICE

CERTIFICATE OF CORRECTION

PATENT NO. : 8,454,868 B2
APPLICATION NO. : 12/328453
DATED : June 4, 2013
INVENTOR(S) : Roemer et al.

It is certified that error appears in the above-identified patent and that said Letters Patent is hereby corrected as shown below:

In the Claims

Claim 6, column 9, line 22, delete “elects” and insert --ejects--.

Signed and Sealed this
Twenty-fourth Day of September, 2013

Teresa Stanek Rea
*Deputy Director of the United States Patent and Trademark Office*